United States Patent [19]
Donaldson et al.

[11] Patent Number: 5,090,650
[45] Date of Patent: Feb. 25, 1992

[54] MOUNTING BRACKET ARRANGEMENT FOR ALIGNING OPTICAL SYSTEM COMPONENTS

[75] Inventors: Robert D. Donaldson; Freddie L. Raleigh, both of Centerville, Ohio

[73] Assignee: Warner & Swasey Company, Cleveland, Ohio

[21] Appl. No.: 559,924

[22] Filed: Jul. 30, 1990

[51] Int. Cl.$^5$ ............................................. F16M 13/00
[52] U.S. Cl. .................................... 248/183; 248/278
[58] Field of Search ............... 248/183, 278, 476, 485, 248/279

[56] References Cited

U.S. PATENT DOCUMENTS

| | | | |
|---|---|---|---|
| 2,161,956 | 6/1939 | Robertson | 403/98 |
| 2,495,065 | 1/1950 | Hull | 248/279 X |
| 2,575,917 | 11/1951 | Johnson | 403/98 X |
| 2,581,298 | 1/1952 | De Forest Roe | 248/278 X |
| 2,596,007 | 5/1952 | Casaroll | 403/98 X |
| 2,721,631 | 10/1955 | Harold | 403/98 X |
| 2,914,829 | 12/1959 | Willemain | 248/278 X |
| 2,933,278 | 4/1960 | Heise | 248/278 X |
| 3,379,403 | 4/1968 | Meehan | 248/278 X |
| 3,436,050 | 4/1969 | Tibbals, Jr. | 248/183 X |
| 4,202,074 | 5/1980 | Hard Af Segerstad | 403/98 X |
| 4,401,288 | 8/1983 | Thompson | 248/476 |
| 4,601,452 | 7/1986 | Rando | 248/183 X |
| 4,687,165 | 8/1987 | Blackburn | 248/476 X |
| 4,721,008 | 1/1988 | Stoups et al. | 403/4 X |
| 4,925,288 | 5/1990 | Harris | 248/485 X |
| 4,944,626 | 7/1990 | Donner | 403/4 X |
| 4,946,120 | 8/1990 | Hatcher | 248/183 |

FOREIGN PATENT DOCUMENTS

| | | | |
|---|---|---|---|
| 1027073 | 5/1953 | France | 248/183 |
| 2549168 | 1/1985 | France | 403/4 |
| 0806851 | 12/1958 | United Kingdom | 248/183 |

*Primary Examiner*—David M. Purol
*Assistant Examiner*—Robert A. Olson
*Attorney, Agent, or Firm*—John R. Benefiel; Raymond J. Eifler

[57] ABSTRACT

A mounting bracket arrangements for an optical component (10) which must be precisely oriented on a base structure (12) and held securely against vibrations, the arrangement including a bracket assembly (14) having first and second bracket plates (24, 26) extending orthogonally with respect to each other. The component (10) is secured to subplate (20) in turn attached to the first bracket plate (24) with a pivot screw (38) and a pair of locking screws (34, 36) so as to enable pivoting adjustment, secured by tightening all of the screws. The second bracket plate (26) is attached to the base structure (12) by a pivot screw (56) and a pair of locking screws (52, 54) so as to enable pivoting adjustment, thereafter secured by tightening all of the screws. A torque plate (50, 62) is installed beneath each set of locking screws to prevent disturbing the adjusted position as the locking screws are tightened. Pairs of aligned holes (68, 70, 74, 76) are formed in the subplate (20) and first bracket plate (24) and second bracket plate (26) and base structure (12) to enable a tool inserted in the holes to be used to adjust the position of the parts. (FIG. 5).

5 Claims, 3 Drawing Sheets

MOUNTING BRACKET ARRANGEMENT FOR ALIGNING OPTICAL SYSTEM COMPONENTS This invention concerns adjustable mounting bracket arrangements for optical components which must be precisely aligned on a base structure, such as the carriages of coordinate measuring machines. Laser interferometer systems are often used as distance measuring elements in machinery such as coordinate measuring machines. The optical elements of the laser system such as beam benders, beam splitters and interferometers must be adjusted angularly in two orthogonal planes, i.e. elevation and azimuth to accurately direct the laser beam to its target during machine setup and then must maintain this alignment for extended periods while subjected to the shock and vibration of machine operation. The usual method of mounting is a wobble plate in which the tilt may be adjusted in two orthogonal planes. Wobble plates however are easily disturbed by vibration, and adjustment of elevation will tend to change azimuth making adjustment tedious and recursive. Also, these components are often directly mounted on a machine structure by relatively small screws relied on to maintain the proper adjustment.

While such mounting is satisfactory in the laboratory, coordinate measuring machines are increasingly used in factory environments, where ambient vibrations tend to cause loosening of the screws and subsequent misalignment of the components.

SUMMARY OF THE INVENTION

The present invention comprises a mounting bracket arrangement including a bracket assembly attached to a base structure and holding an optical component, the mounting bracket assembly including first and second oppositely extending bracket plates integral or attached to each other to extend orthogonally to each other. The optical or other component to be mounted is fastened to a subplate by threaded fasteners, semipermanently secured with a thread locking adhesive. The subplate in turn is adjustably mounted to the first bracket plate by a screw passing through the first bracket plate and received in the base plate, this screw defining a pivot axis. A pair of spaced apart adjustment locking screws pass through oversize holes in the first bracket plate and are received in the subplate. A torque plate is disposed beneath the screws which pass through hole therein, preventing the bracket assembly from shifting when the locking screws and pivot screw are tightened, with locking washers preventing loosening of the screws themselves.

An intermediate opening in the first bracket plate aligned with a small diameter opening in the subplate allows adjusting rotation of the bracket assembly about the pivot axis by use of a tool to cam the bracket plate, facilitating adjustments.

The second bracket plate in turn is similarly adjustably mounted to the base structure by a screw passing through the second bracket plate and received in the base structure, defining a pivot axis orthogonal to the pivot axis of the first bracket plate. A pair of locking screws pass through the second bracket plate, received in the base structure.

A torque plate prevents rotation of the second bracket plate when the pair of locking screws or single pivot screw are tightened, with lock washers preventing loosening of these tightened screws.

A hole in the second bracket plate aligned with a smaller diameter hole in the base structure allows easy adjustment of the second bracket plate by pivoting about the pivot axis with tipping of a tool inserted in the holes.

The bracket assembly has the advantage of allowing easy and precise angular adjustment of the mounted component in two orthogonal axes, and secure retention in the adjusted position. The angular adjustments in each plane is independent to eliminate the recursive adjustments of the prior art.

DETAILED DESCRIPTION

Figure 1:
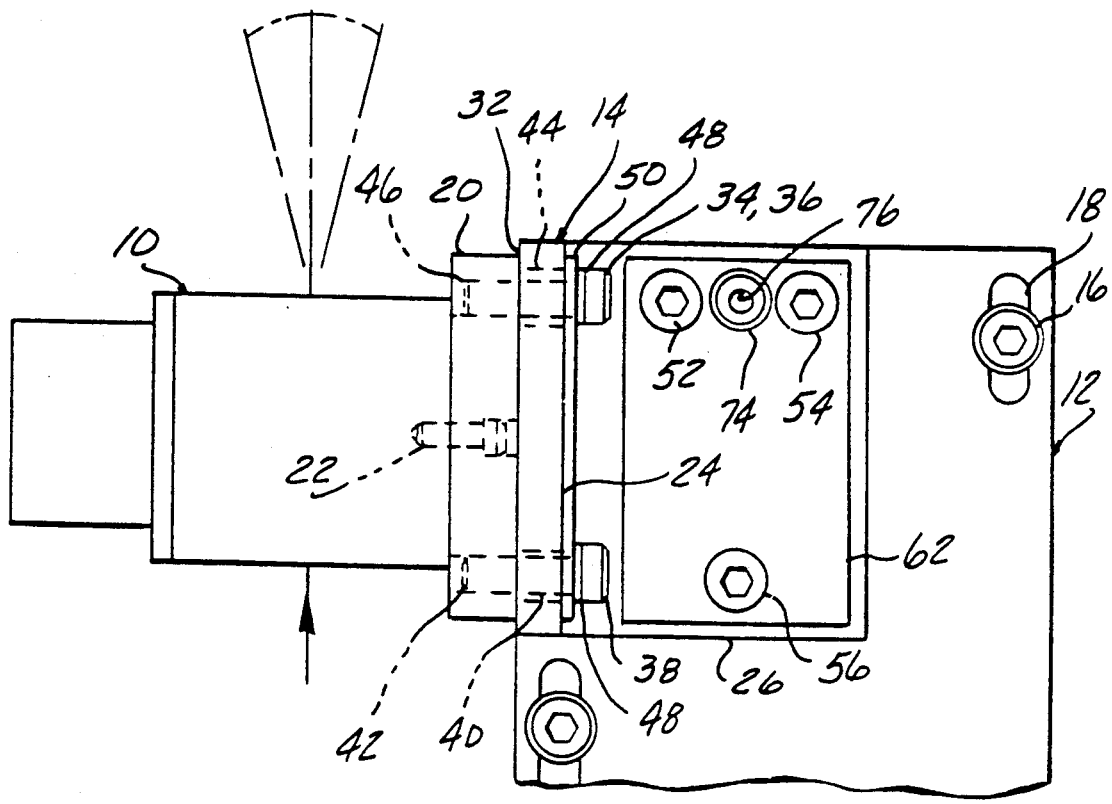
FIG. 1 is a front elevational view of the bracket assembly according to the present invention, and a mounted optical component.
Figure 2:
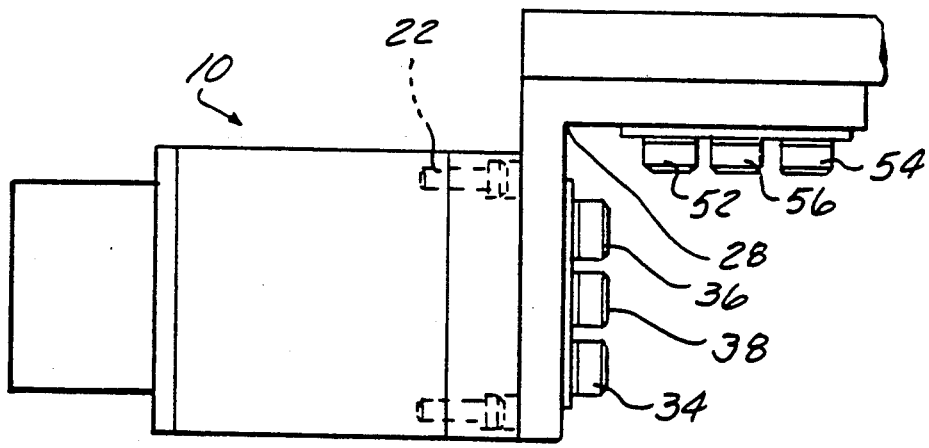
FIG. 2 is a plan view of the bracket assembly shown in FIG. 1.

FIGS. 1 and 2 illustrate an optical component 10 mounted on a base plate 12 for adjustment, able to be pivoted about two orthogonal axes by means of a bracket assembly 14. The base plate 12 may be a attached to a machine or other structure by a series of capscrews 16 passing through slots 18. Alternatively, the pivot and locking screws 52, 54, 56, described herein may be used to attach bracket assembly 14 to the machine, without base plate 12.

The optical component 10 is secured to a subplate 20 by the original small diameter mounting screws 22, which are preferably coated with a thread adhesive, such as "LOCTITE" (TM) to semipermanently assemble the component 10 to the subplate 20.

The bracket assembly 14 includes first and second bracket plates 24, 26 integral with each other or fixed together as by being welded at joint 28 so as to extend normally from each other.

The planes of the first and second bracket plates 24, 26 are thus orthogonal to each other and define respective orthogonal mounting surfaces 32, 30.

The subplate 20 is positioned against the mounting surface 32 of the first bracket plate 24, and adjustably secured thereto with a pair of locking capscrews 34, 36, and a pivot axis cap screw 38. Capscrew 38 passes through a close fitted bore 40 one side of the first bracket plate and is threaded into a threaded hole 42 in the subplate 20, and defines a pivot axis for adjusting rotation of subplate 20 (and attached component 10) on the first bracket plate 24.

The pair of locking capscrews 34, 36 pass through oversized clearance bores 44 in the first bracket plate 24 and are received in threaded bores 46 in the subplate 20. The locking screws 34, 36 are loosened to enable relative shifting of the subplate 20 and thereafter tightened. Lock washers 48 are provided and the locking screws 34, 36 and pivot screw 38. The locking washers 48, the relative size and spacing of the screws 34, 36, 38 compared to the optical component mounting screws 22 greatly increase resistance to vibration induced loosening.

A torque plate 50 is formed with a mating hole pattern so as to be secured beneath the locking screws 34, 36, and pivot screw 38. The torque plate 50 minimizes the tendency for rotation of the subplate 20 when the locking screws 34, 36 and pivot screw 38 are tightened so as to maintain the adjusted position thereof.

A similar arrangement is provided for the second bracket plate 26, in which a pair of locking screws 52, 54 and a pivot screw 56 pass through the second bracket plate 26 and into threaded holes 58, 60 in the base structure 12. The holes 66 are oversize to allow adjusting pivoting about the pivot screw 56.

A torque plate 62 and lock screws 52, 54 are also provided, as with the first bracket plate 24 mounting arrangement.

Figure 3:
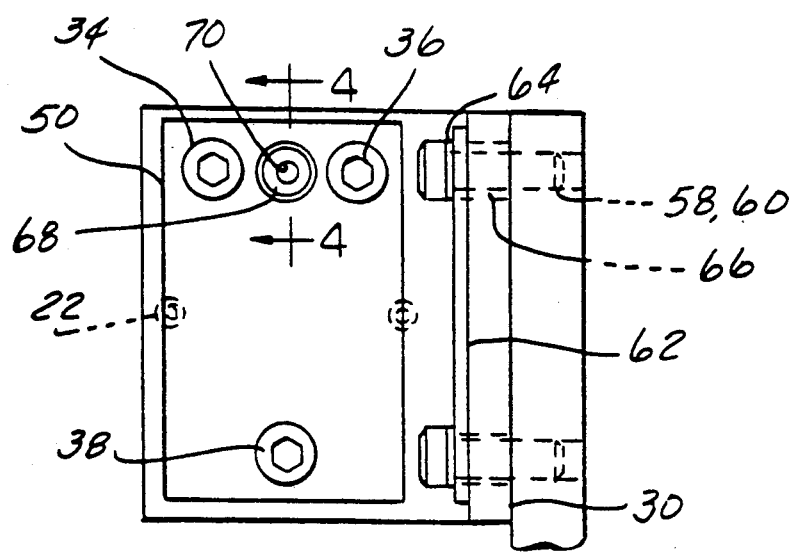
FIG. 3 is an end view of the bracket assembly shown in FIG. 1.
Figure 4:
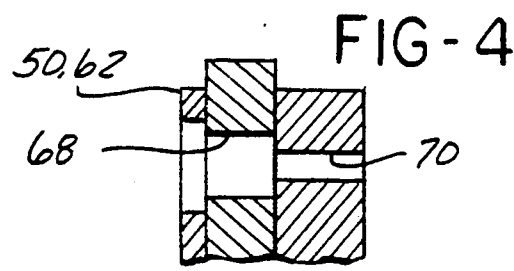
FIG. 4 is a fragmentary, enlarged view of the section taken through adjustment hole in FIG. 1.

FIG. 3 shows that a large diameter hole 68 is provided in the first bracket plate 24, intermediate the locking screws 34, 36, and aligned with a smaller diameter hole 70 in the subplate 20. This allows a pointed tool such as a Phillips screw driver to be inserted, and tipping of the inserted tool causes leveraged shifting of the relative position of these structures, to facilitate adjustment.

Similarly, aligned holes 74, 76 are provided in the second bracket plate 26 and base structure 12 for the same purpose.

This arrangement provides a much more vibration resistant adjustable mounting of the component 10 than by direct mounting with the small diameter, closely spaced screws 22.

Figure 5:
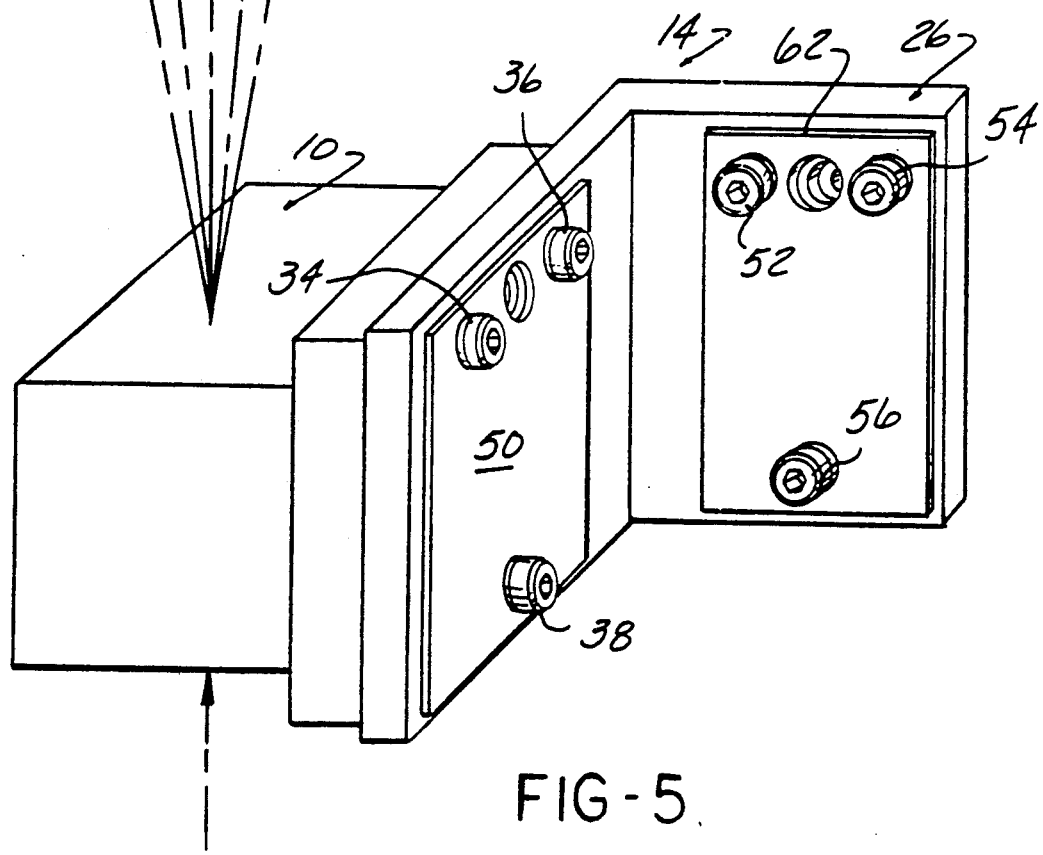
FIG. 5 is a perspective view of the bracket assembly shown in FIGS. 1-3.

FIG. 5 shows that the arrangement also facilitates the adjustment process by isolating angular adjustments in each plane, X, Y as indicated in FIG. 5.

Figure 6:
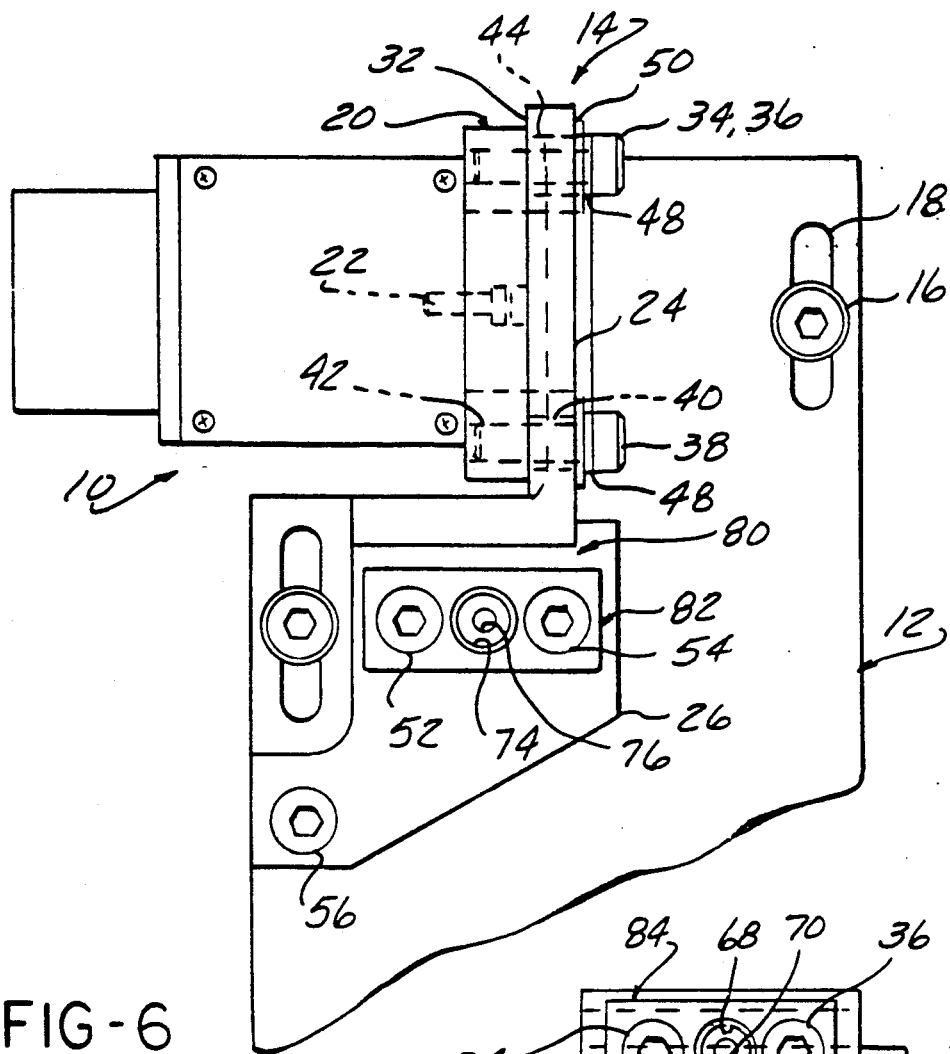
FIG. 6 is an fragmentary front elevational view of a bracket assembly according to another embodiment of the invention.
Figure 7:
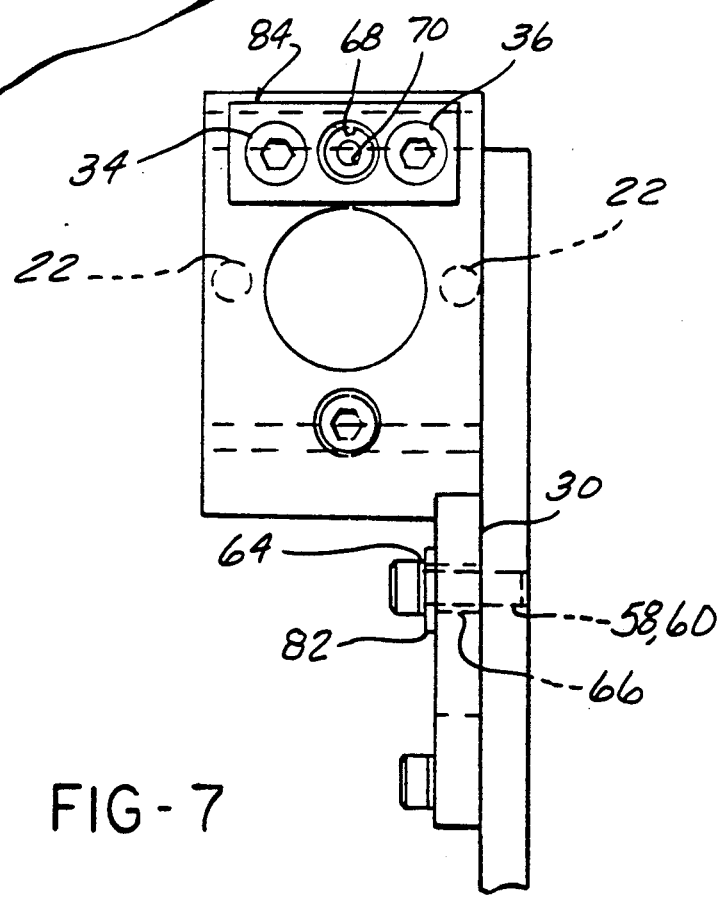
FIG. 7 is a side elevational view of the embodiment shown in FIG. 6.

FIGS. 6 and 7 show an alternate embodiment where the first and second bracket plates 24, 26 of the bracket assembly 14 are joined end to end, as well as in a 90 degree rotated orthogonal relationship as in the above described embodiment.

In this embodiment, the plates 24, 26 are integral with each other or connected as by welding at the joint 80.

Also, elongated torque plates 82, 84 are used, disposed only beneath the locking screws pairs 34, 36 and 52, 54 to prevent shifting upon tightening.

We claim:

1. A mounting bracket arrangement for adjustably mounting a component (10) on a base structure (12), the improvement comprising:

a subplate (20) having said component (10) affixed thereto;

a bracket assembly (14) comprising oppositely extending first and second bracket plates (24,26) with the respective planes thereof extending 90 degrees from each other;

subplate attachment means (34, 36, 38) for securing said subplate (20) to said first bracket plate (24);

base structure attachment means (52, 54, 56) securing said base structure (12) to said second bracket plate (26);

said subplate attachment means including a pivot screw (38) extending through a close fitted bore at one side of said first bracket plate (24) and into said subplate (20) to define a first fixed pivot axis and at least one locking screw (34, 36) spaced from said pivot screw (38) and passing through an opening (44) in said first bracket plate (24) and into said subplate (20) with sufficient clearance with said opening (44) in said first bracket plate (24) to enable adjusting pivoting of said subplate (20) with said pivot screw (38) and said at least one locking screw (34, 36) loosened;

said base structure attachment means including pivot screw (56) extending through a close fitted bore at one side of said second bracket plate (26) and into said base structure (12) to define a second fixed pivot axis orthogonal to said first pivot axis, and at least one locking screw (52, 54) extending through an opening (66) in said second bracket plate (26) and into said base structure (12) with sufficient clearance between said at least one locking screw (52, 54) and said opening (66) in said second bracket plate (26) to enable adjusting pivoting of said second bracket plate (26) on said base structure (12) said subplate attachment means including a set of two locking screws (34, 36) and said base structure attachment means including a set of two locking screws (52, 54); and, a single torque plate (50, 62) located beneath each set of locking screws (34, 36, 52, 54) with each pair of said locking screws (34, 36, 52, 54) each passing therethrough a single torque plate (50, 62), whereby any tendency of tightening of said locking screws to cause shifting of said first or second bracket plates is avoided.

2. The mounting bracket arrangement according to claim 1 further including an adjustment opening (68, 74) in each of said first bracket plate (24) and said second bracket plate (26) located spaced from said first and second fixed pivot each adjustment opening (68, 74) aligned with a slightly smaller diameter adjustment opening (70, 76) in said subplate (20) and base structure (12) respectively, whereby the position of said first and second bracket plates (24, 26) can be adjusted about each fixed pivot axis with respect to said subplate (20) and base structure (12) respectively by tipping of a tool inserted in said aligned adjustment openings.

3. The mounting bracket arrangement according to claim 1 further including an adjustment opening (68, 74) in each of said first bracket plate (24) and said second bracket plate (26) spaced from said first and second fixed pivot axes respectively each adjustment opening (68, 74) aligned with a smaller diameter adjustment opening (70, 76) in said subplate (20) and base structure (12) respectively, whereby the position of said first and second bracket plates (24, 26) can be adjusted about each fixed pivot axis with respect to said subplate (20) and base structure (12) respectively by a tool inserted in said aligned adjustment openings.

4. The mounting bracket arrangement according to claim 1 wherein said component (10) is affixed to said subplate (20) with screws (22) smaller in diameter than said pivot and locking screws (34, 36, 38).

5. The mounting bracket arrangement according to claim 1 further including lock washers (48, 64) on each of said pivot and locking screws (34, 36, 38, 52, 54, 56).

* * * * *